United States Patent [19]

Thoe

[11] Patent Number: 4,637,052
[45] Date of Patent: Jan. 13, 1987

[54] METHOD AND APPARATUS FOR ENHANCING MICROCHANNEL PLATE DATA

[75] Inventor: Robert S. Thoe, Livermore, Calif.

[73] Assignee: The United States of America as represented by the Department of Energy, Washington, D.C.

[21] Appl. No.: 544,930

[22] Filed: Oct. 24, 1983

[51] Int. Cl.$^4$ .............................................. G06K 9/00
[52] U.S. Cl. ............................... 382/1; 250/213 VT; 364/570; 364/715; 382/41
[58] Field of Search ...................... 382/41, 1; 364/715, 364/764, 811, 570, 734; 250/213 VT

[56] References Cited

U.S. PATENT DOCUMENTS

| | | | |
|---|---|---|---|
| 3,591,785 | 7/1971 | Miller | 364/602 |
| 3,958,079 | 5/1976 | Case et al. | 358/93 |
| 4,004,083 | 1/1977 | Norem | 358/125 |
| 4,357,673 | 11/1982 | Willis et al. | 364/582 |
| 4,435,837 | 3/1984 | Abernathy | 382/41 |
| 4,499,597 | 2/1985 | Alves | 382/41 |
| 4,521,688 | 6/1985 | Yin | 250/369 |
| 4,551,817 | 11/1985 | Ishikawa | 364/715 |
| 4,555,731 | 11/1985 | Zinchuk | 250/213 VT |

OTHER PUBLICATIONS

Lampton et al., "Low Distortion Resistive Anodes for Two-Dimensional Position-Sensitive MCP Systems", *Rev. Sci. Instrum.*, 50(9), Sep. 1979, pp. 1093-1097.
Parkes et al., "High Resolution Position-Sensitive Detectors Using Micro-Channel Plates", *Nuclear Instruments and Methods*, 121, 1974, pp. 151-159.
Timothy et al., "Multianode Micro-Channel Array Detectors for Space Shuttle Imaging Applications", *SPIE*, vol. 265, 1981, pp. 93-105.

"8×8 Multiplier/Divider Sn54/74S508", Monolithic Memories Company, pp. 11-3 to 11-16.
"The TTL Data Book for Design Engineers, 2nd Edition", 1976, Texas Instruments, Inc., pp. 1-1 to 1-28.
"Logic Data Book", 1981, National Semiconductor Corp., pp. iii-x.
Larson et al., *Calculus with Analytic Geometry*, 1979, pp. 299-301.

Primary Examiner—Leo H. Boudreau
Assistant Examiner—Joseph Mancuso
Attorney, Agent, or Firm—Gary C. Roth; L. E. Carnahan; Judson R. Hightower

[57] ABSTRACT

A method and apparatus for determining centroid channel locations is disclosed for use in a system activated by one or more multichannel plates (16,18) and including a linear diode array (24) providing channels of information 1, 2, ..., n, ..., N containing signal amplitudes $A_n$. A source of analog $A_n$ signals (40), and a source of digital clock signals n (48), are provided. Non-zero $A_n$ values are detected in a discriminator (42). A digital signal representing p, the value of n immediately preceding that whereat $A_n$ takes its first non-zero value, is generated in a scaler (50). The analog $A_n$ signals are converted to digital in an analog to digital converter (44). The digital $A_n$ signals are added to produce a digital $\Sigma A_n$ signal in a full adder (46). Digital 1, 2, ..., m signals representing the number of non-zero $A_n$ are produced by a discriminator pulse counter (52). Digital signals representing 1 $A_{p+1}$, 2 $A_{p+2}$, ..., m $A_{p+m}$ are produced by pairwise multiplication in multiplier (54). These signals are added in multiplier summer (56) to produce a digital $\Sigma nA_n - p\Sigma A_n$ signal. This signal is divided by the digital $\Sigma A_n$ signal in divider (58) to provide a digital $(\Sigma nA_n / \Sigma A_n) - p$ signal. Finally, this last signal is added to the digital p signal in an offset summer (60) to provide $\Sigma nA_n / \Sigma A_n$, the centroid channel locations.

5 Claims, 3 Drawing Figures

METHOD AND APPARATUS FOR ENHANCING MICROCHANNEL PLATE DATA

The U.S. Government has rights in this invention pursuant to Contract No. W-7405-ENG-48 between the U.S. Department of Energy and the University of Calif. for the operation of Lawrence Livermore National Laboratory.

BACKGROUND OF THE INVENTION

The invention described herein relates generally to data enhancement systems, and more particularly to systems for enhancing the data from measuring instruments comprising at least one microchannel plate.

Spectroscopic measurements of the energy distributions of aggregations of photons and particles are often made. These measurements frequently employ the use of one or more microchannel plates. A microchannel plate is a parallel array of individual electron multiplier channels. Channel diameters are typically in the range of about 12 to 100 microns. Microchannel plates are usually comprised of glass formed as a polygonal or round disk about 2 to 5 centimeters in diameter and about 0.6 to 4 millimeters thick. In their manufacture, glass is first drawn into tubular fibers. Then, lengths of the fiber are formed into a parallel bundle which is fused together by the application of pressure and heat. Plates are made by cutting the fused bundle into slices and polishing the faces of each slice. The channel plates are heated in hydrogen to produce a very thin semiconducting surface film on the channel walls, to obtain the necessary electrical conductance and secondary emission properties required for channel electron multiplication. Finally, metal electrodes are applied to both faces of the plate by vacuum deposition. A microchannel plate is operated in a vacuum with different potentials applied to the electrodes to produce an axial electric field through the channels. When radiation in the form of electrons, photons, X-rays, etc. enters the low potential end of a channel and strikes the inner surface with sufficient energy, electrons are emitted from the surface. The emitted electrons collide with the walls repeatedly as they are accelerated toward the output end of the channel by the applied electric field, producing additional secondaries. Ultimately, a very large number of electrons produced by such multiplication are emitted from the high potential end of the channel. The electronic gain of a channel depends on its length to diameter ratio, on the magnitude of the applied potentials, and on the secondary emission characteristics of the semiconducting inner wall surface.

A schematic representation of a known spectroscopic measurement system employing microchannel plates is given in FIG. 1. Emission, such as photons, charged particles or the like, from a continuously emitting source, 10, is collimated by collimator 12 and introduced to a dispersive element, 14, such as a grating, a bent crystal, a magnet or the like, and thereby spatially resolved by energy into a spectral distribution. It is frequently of great theoretical and practical importance to measure these spectral distributions. An often used technique for doing this, as indicated in FIG. 1, is to allow the dispersed spectral distribution to encounter a microchannel plate, 16. The particular location at which any spectral particle hits the microchannel plate is determined by the energy of the particle. This energy of a spectral particle is represented by $E_1$, $E_2$, and $E_3$ in FIG. 1. Typically, when a single spectral particle hits a channel, or pore, of a microchannel plate, a pulse comprising on the order of 1,000 electrons is produced. Often, as shown, two microchannel plates, 16 and 18, are employed in series, thereby together producing a pulse, representing the single spectral particle, comprising on the order of 1,000,000 electrons. These electrons strike a phosphor layer 20 and produce photons which are conducted by a fiber-optics element 22 to a linear diode array 24. Analog output from the linear diode array may be amplified, stored in a memory, or subjected to various forms of electronic logic in unit 26. Ultimately, the combined output from the linear diode array, generated by a huge number of spectral particles, is accumulated and may be displayed on an oscilloscope, 28, in a trace representative of the spectral distribution.

A linear diode array provides N channels of information, 1, 2, ... N, with n typically varying from 1 to 1024. The numbering of the N channels is consecutive along the linear diode array so as to correspond to a monotonic sequence of spectral particle energies. Each channel n contains an analog signal amplitude $A_n$. The dynamic range of a linear diode array channel is typically about 250. The value of $A_n$ is zero in those channels that are not activated. Ideally a single spectral particle should cause the activation of only a single linear diode array channel, with that single channel at the location appropriate for the energy of the single spectral particle. Linear diode array channels remain activated for only a limited, very short period of time. As shown in FIG. 1, a serious disadvantage of the prior art is the spatial spreading of the electrons produced by the microchannel plate and linear diode array apparatus. This results in a single spectral particle causing the activation of not one but rather a multiplicity of linear diode array channels. The consequence of this is a spreading out, or blurring, of the output data. This is indicated in FIG. 2 which schematically shows the input to memory, 30, representing one spectral particle. Ideally, only one channel should contain a non-zero amplitude above the discrimination level. When data from a great many spectral particles are summed to give a measured spectral distribution, this blurring problem causes the result to be lacking of detailed features, thereby greatly diminishing the value of the measurement.

This blurring problem could be overcome by finding the centroid channel location corresponding to each individual spectral particle. The centroid channel location for a spectral particle is given mathematically by $\Sigma n A_n / \Sigma A_n$. That is, in principle the accumulating data could be separately analyzed for the centroid channel location of each individual spectral particle, with only the centroid channel locations being processed as output. The problem in doing this is that in the usual case data is being accumulated for individual spectral particles at a very high rate, such as thousands per second. Consequently, even though a very limited number of centroid channel location calculations are possible, there is presently no adequate means for calculating centroid channel locations for spectroscopic measurement systems such as the system schematically represented in FIG. 1 which must maintain an extremely high rate of data throughput.

Resistive anode position-sensitive detectors are discussed by Lampton et al., Rev. Sci. Instrum. 50 (9), 1979, pages 1093 to 1097. These detectors encode the location of an event by distributing the charge of the electron cloud produced by a microchannel plate among a number of output terminals. In other words, approximate centroid channel locations are determined by roughly balancing the outputs from the sides of resistive strips. Unfortunately, this technique is very slow and of limited accuracy. Instruments of this type, which tend to be relatively expensive, are supplied by Surface Science Laboratories, Inc. of Palo Alto, Calif.

A microchannel plate used as a single photon detector is described by Parkes et al., in Nuclear Instruments and Methods 121 (1974), pages 151 to 159. An anode collector plate is placed close to the output face of the biased microchannel plate so as to deliver the charge output to a sense amplifier. The detector is made position sensitive by arranging the collector plate as an RC transmission line terminated in suitable amplifiers and filters. Several circuit arrangements permit the extraction of position information. The scheme requires that a very large amount of data be converted from analog form to digital form. Positional data obtained by the detector is spatially spread out in a manner characterized by a line spread function that is approximately Gaussian. For the system as described high rate operation is limited by the pulse pile-up behaviour of the terminal amplifiers.

Coincidence-anode multi-anode microchannel arrays are described by Timothy et al. in SPIE Vol. 265, "Shuttle Pointing of Electro-Optical Experiments", pages 93 to 105. These arrays employ two sets of mutually insulated anode electrodes exposed to the output face of the microchannel plate. In these arrays the spatial location of an event is determined by the simultaneous detection of a charge pulse on the two sets of anode electrodes. Using this technique, a total of a times b pixels can be uniquely defined using only a total of a plus b sets of anode electrodes. This technique is not related to the problem of determining the centroid channel location of a multiplicity of activated linear diode array channels.

Case et al., in U.S. Pat. No. 3,958,079 issued May 18, 1976, teaches a device for improving the vertical resolution of a two-dimensional television-based radiation detection system. Data indicative of the centroid location of an image is obtained by digital logic circuits which determine the location and number of the raster scan lines detecting the image. The centroid value is assumed to depend only on the number of raster lines displaying the image, and no account is taken of any intensity variation over the extent of the image. In other words, no account is taken of the amplitude of the image signal. For example, if an event is imaged over scan lines 10 through 13, the centroid of the image is determined to be located exactly between lines 11 and 12.

Miller, in U.S. Pat. No. 3,591,785 issued July 6, 1971, teaches a signal averaging system for determining the average magnitude of a plurality of separate input signals of diverse magnitudes. An output signal representative of the sum of all the separate input signals is first produced. Then, this summed output signal is divided by the total number of the separate input signals. The average magnitude of a plurality of signals is entirely different from the locational centroid of a plurality of responding data channels.

Willis et al., in U.S. Pat. No. 4,357,673 issued Nov. 2, 1982, teach an instrument which performs a series of sample, reference, and dark measurements to generate a normalized result. The average and the variance of measurements made by the instrument are calculated. This enables the cancellation of measurement variation due to variation in instrument response.

Thus, for spectroscopic measurement systems as schematically indicated in FIG. 1 to produce detailed and precise measured spectral distributions, the major problem of how to rapidly and accurately determine the centroid channel location of the multiplicity of linear diode array channels activated by the spatially spread out pulse of electrons produced by one or more multichannel plates driven by a single spectral particle must be solved.

SUMMARY OF THE INVENTION

It is therefore an object of the invention to provide method and apparatus for rapidly determining the centroid channel location of a multiplicity of activated linear diode array channels.

Another object of the invention is to provide method and apparatus for accurately determining the centroid channel location of a multiplicity of activated linear diode array channels.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method and apparatus of this invention may comprise a data enhancement system for rapidly and accurately determining the centroid channel location, $\Sigma nA_n/\Sigma A_n$, for the N channels of information provided by a linear diode array. A sequence of analog signals representative of signal amplitudes $A_n$, and a synchronized therewith sequence of digital clock signals representative of linear diode array channels n, are provided. A discriminator detects non-zero $A_n$ values. When the discriminator first detects and fires, it causes the value of n immediately preceding that whereat $A_n$ takes its first non-zero value, p, to be latched in a scaler. The analog $A_n$ signals are converted to digital signals in an analog to digital converter. The digital $A_n$ signals are added in a full adder to give a digital $\Sigma A_n$ signal. Consecutive digital signals representative of the m pulses from the discriminator are produced by a discriminator pulse counter and are pairwise multiplied with the digital $A_n$ signals in a multiplier to provide 1 $A_{p+1}$, 2 $A_{p+2}$, . . . , m $A_{p+m}$ signals. These signals are summed in a multiplier summer to provide an $\Sigma nA_n - p\Sigma A_n$ signal, which is then divided in a divider by the $\Sigma A_n$ signal to provide a $(\Sigma nA_n/\Sigma A_n) - p$ signal. When this signal is added to the value p, which is latched in the scaler, in an offset summer the desired centroid channel location, $\Sigma nA_n/\Sigma A_n$, is obtained. It is preferred to use a memory programmed with a look up table giving the quotient values associated with all possible dividend/divisor combinations for the division.

The benefits and advantages of the present invention, as embodied and broadly described herein, include, inter alia, the provision of method and apparatus for rapidly and accurately determining the centroid channel location of a multiplicity of activated linear diode array channels.

BRIEF DESCRIPTIONS OF THE DRAWINGS

The accompanying drawings, which are incorporated in and form a part of the specification, illustrate an embodiment of the invention and, together with the description, serve to explain the principles of the invention. In the drawings.

DETAILED DESCRIPTION OF THE INVENTION

Figure 1:
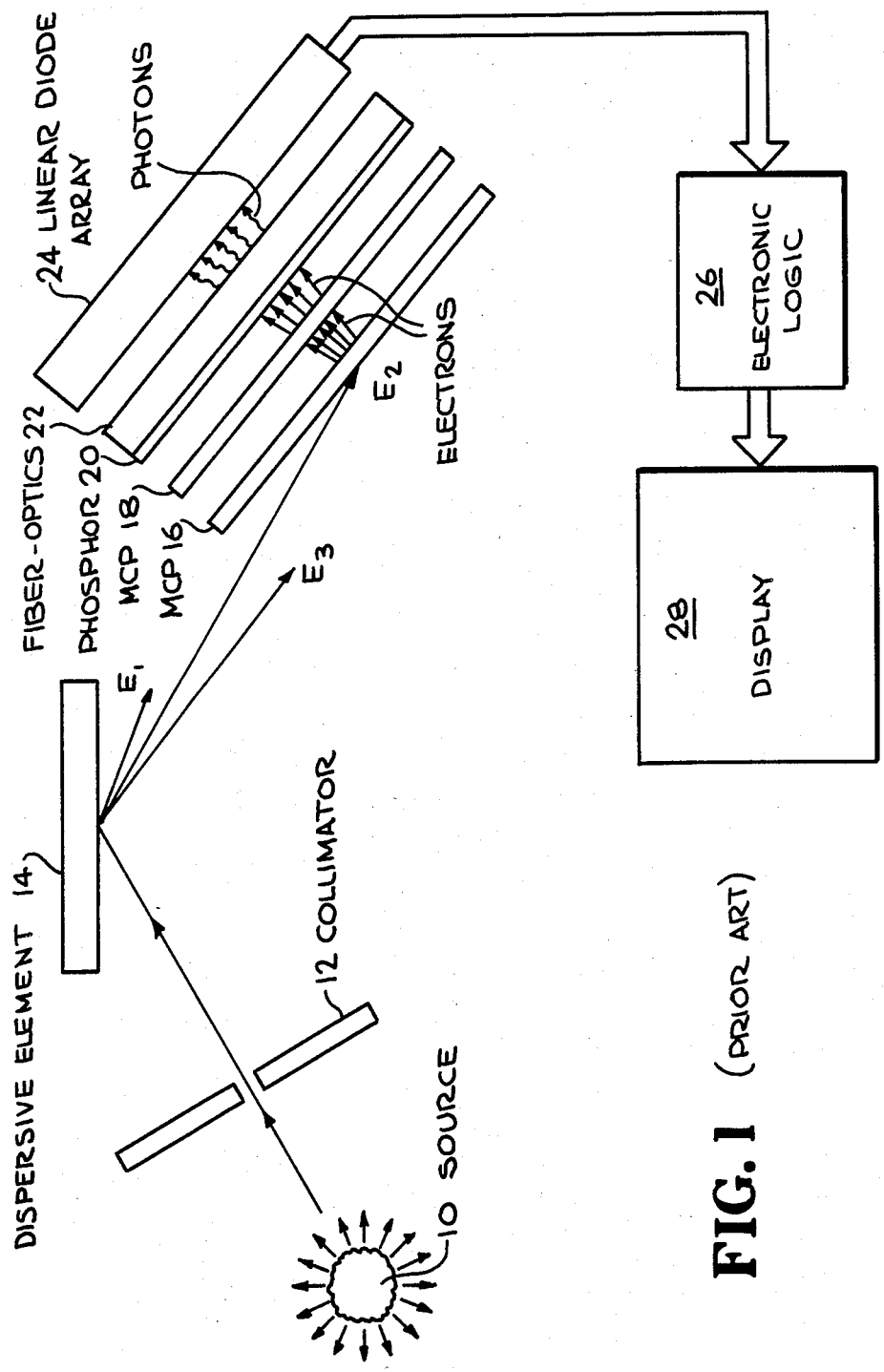
FIG. 1 is a schematic representation of a spectroscopic measurement system employing microchannel plates, as known in the prior art.
Figure 2:
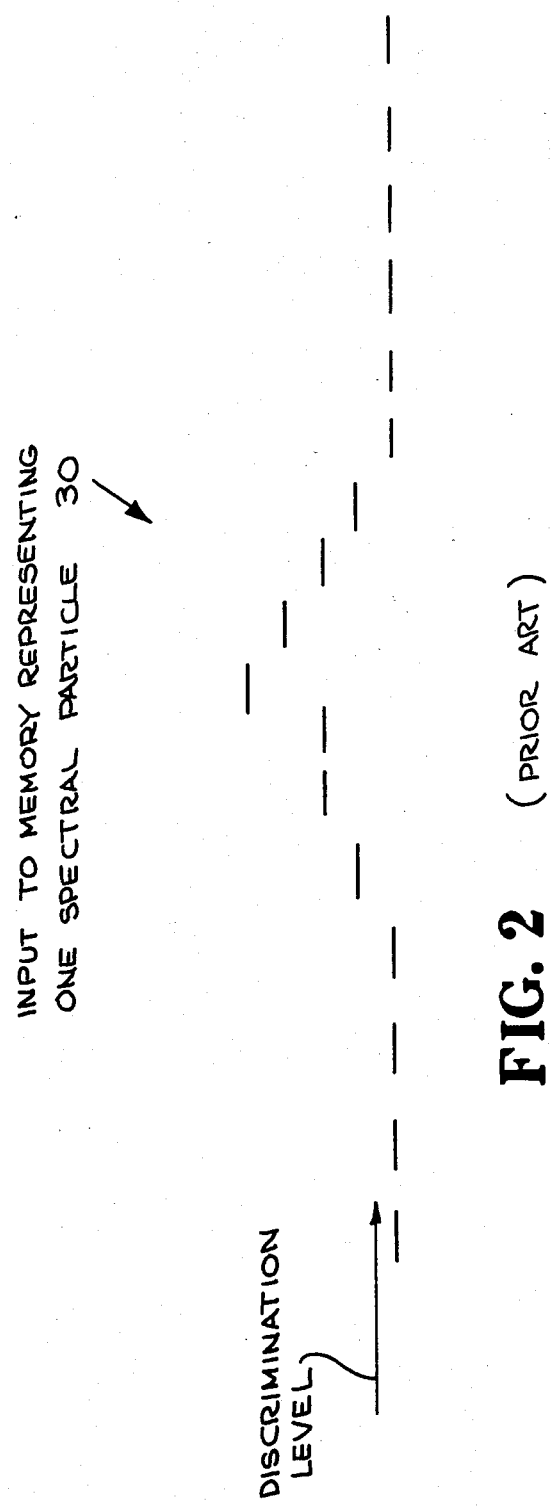
FIG. 2 is a schematic representation of the input to memory representing one spectral particle, of the prior art spectroscopic measurement system of FIG. 1.

Reference will be made in detail to the present preferred embodiment of the invention, an example of which is illustrated in the accompanying drawings. Reference has been made above to FIG. 1, which shows a schematic representation of a prior art spectroscopic measurement system employing microchannel plates. Reference has also been made above to FIG. 2, which shows a schematic representation of the input to memory, representing one spectral particle, of the prior art spectroscopic measurement system of FIG. 1.

Figure 3:
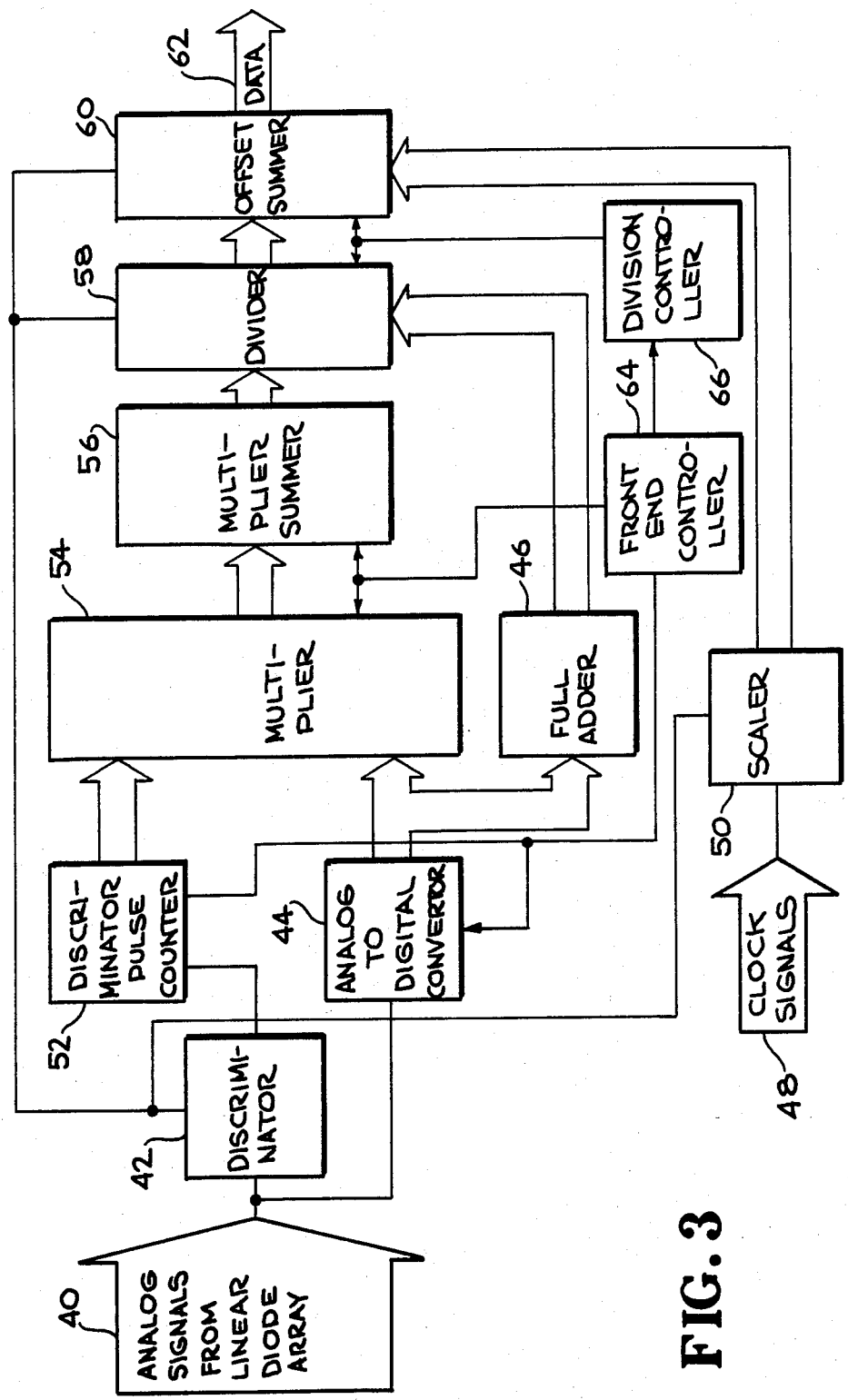
FIG. 3 is a block diagram of apparatus for rapidly and accurately determining the centroid channel location of a multiplicity of activated linear diode array channels, according to the present invention.

Reference is now made to FIG. 3 which shows a block diagram, in accordance with the invention, of apparatus for rapidly and accurately determining the centroid channel location of a multiplicity of activated linear diode array channels, which can be used for enhancing the data from measuring instruments comprising at least one microchannel plate. At any time, as previously described, the linear diode array provides N channels of ordered information 1, 2, ..., n, ... N with each channel n containing an analog signal amplitude $A_n$. Except for those channels presently activated, the value of each $A_n$ is zero. The N channels are interrogated sequentially at a very rapid scan rate so that, to an extremely high probability, during each individual scan any non-zero $A_n$ values are all produced by only one single spectral particle. The non-zero $A_n$ values representative of each distinct spectral particle occupy sequential and adjacent channels with no zero values therebetween and are provided by the linear diode array only during one single scan. The analog signals resulting from this scan, 40, are introduced at the left side of FIG. 3. The apparatus for producing analog signals 40 is extremely well known and is not shown in FIG. 3. Thus, signals 40 provide a sequence of analog signals representative of signal amplitudes $A_n$.

At the same time, and in synchronization with signals 40, an external clock pulse generator, not shown, provides a sequence of digital clock signals 48 representative of the consecutive and repeatedly scanned linear diode array channels 1, 2, ..., n, ... N. Thus analog signals 40 provide the apparatus schematically indicated in FIG. 3 with $A_n$ information, and digital signals 48 provide the apparatus with synchronized information concerning n.

Discriminator 42, which is set at a level above system noise, receives signals 40. Whenever, during a scan, discriminator 42 detects a non-zero $A_n$ it fires. The pulses from discriminator 42 are sent to discriminator pulse counter 52.

Scaler 50, which is reset at the end of each scan, receives signals 48 and operates in a continuously counting mode. When, during a scan, discriminator 42 first fires it sends a signal to scaler 50. This causes the value then obtaining in scaler 50, minus 1, to be latched for presentation to offset summer 60. Thus, offset summer 60 is given the value of n immediately preceding that whereat $A_n$ takes its first non-zero value, during a scan. This value may be represented by p.

Concurrently, analog signals 40 are converted to digital signals by analog to digital converter 44. After conversion, analog to digital converter 44 provides a sequence of digital signals representative of signal amplitudes $A_n$ to multiplier 54 and full adder 46. The digital signal amplitudes, $A_n$, are added, to provide a digital $\Sigma A_n$ signal, in full adder 46.

Discriminator pulse counter 52, driven by the pulses from discriminator 42, provides a sequence of consecutive digital signals representative of 1, 2, ..., m where m is the total number of linear diode array channels containing non-zero $A_n$, to multiplier 54. Thus, multiplier 54 is provided with signals representative of the non-zero $A_n$ values by analog to digital converter 44, and with signals representative of their n values, offset by the value p latched in scaler 50, by discriminator pulse counter 52. These signals are pairwise multiplied together in multiplier 54 to provide the digital signals 1 $A_{p+1}$, 2 $A_{p+2}$, ..., m $A_{p+m}$.

These last described digital signals are sent to multiplier summer 56 where the summation 1 $A_{p+1}$+2 $A_{p+2}$+...+m $A_{p+m}$ is performed. This value is equal to $\Sigma(n-p)A_n$ or $\Sigma nA_n - p\Sigma A_n$.

The digital signal representative of $\Sigma nA_n - p\Sigma A_n$ is presented from multiplier summer 56 to divider 58. Additionally, the digital signal representative of $\Sigma A_n$ is presented to divider 58 from full adder 46. When discriminator 42 senses that $A_n$ is once again below the noise threshold, these two signals are divided in divider 58 to provide a digital signal representative of $(\Sigma nA_n/\Sigma A_n) - p$. Thus, this signal represents the desired centroid channel location of a multiplicity of activated linear diode array channels, minus p. This signal is sent to offset summer 60 where it is added to the digital signal representative of p sent from scaler 50. This produces a digital signal representative of the desired centroid channel location $\Sigma nA_n/\Sigma A_n$.

Signals representing the centroid channel locations of many spectral particles are sent from the apparatus for final processing as data 62. The sequential operation of the apparatus is controlled by front end controller 64 and division controller 66.

The individual components of the apparatus represented in FIG. 3 such as discriminators, clocks, scalers, analog to digital converters, pulse counters, multipliers, adders, summers, controllers, and so forth are all very well known and are all described in detail in many text books and data books in general use in the field of electronic engineering. Two such books, which are hereby incorporated by reference herein, are "The TTL Data Book for Design Engineers, 2nd Edition" (1976) published by Texas Instruments, Incorporated, and "Logic Databook" (1981) published by National Semiconductor Corporation. In general, most of the components are available in a multiplicity of generally equivalent structures with the choice of any particular structure not a critical feature of the invention disclosed herein.

The only component of FIG. 3 of a specialized nature is divider 58. Divider 58 is the slowest performing of the components, and thus it limits the scan rate of the system. Nevertheless, there exist many divider circuits that are more than adequate for use as divider 58. Since the collection of possible divisors and dividends to be encountered in the practice of this invention is limited, it is fastest and thus preferred, to perform the function of divider 58 by programming a memory with a look up table giving the quotient values associated with all possible dividend/divisor combinations. Additionally, it is possible to perform the function of divider 58 through the use of TTL logic, such as is employed in SN54/74S508 units which are bus-organized 8×8 high speed multiplier/divider devices. These devices are supplied by Monolithic Memories Company of Sunnyvale, Calif. Also, there are many algorithms for performing division utilizing standard off-the-shelf components. One such commonly used algorithm repetitively subtracts the divisor from the dividend until a borrow is observed.

It is thus appreciated that in accordance with the invention as herein described and shown in FIG. 3, a method and apparatus is provided for rapidly and accurately determining the centroid channel location of a multiplicity of activated linear diode array channels.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, the method and apparatus of this invention can be extended to rapidly and accurately determining the multi-dimensional centroid location of a multiplicity of multi-dimensional activated data array channels. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. In a spectroscopic system for measuring an energy distribution of an emission from a continuously emitting source, which includes a collimator for collimating said emmission, a dispersive element for spatially resolving said emission by energy into a spectral particle distribution, an assemblage of one or more series employed microchannel plates disposed so that the particular location at which any said spectral particle hits the first said microchannel plate is determined by the energy of said spectral particle, a phosphor layer associated with said assemblage of microchannel plates for producing photons when struck by electrons generated by said assemblage of microchannel plates when hit by said spectral particles, a fiber-optics element for conducting said photons to a linear diode array with said linear diode array providing N channels of information that remain activated by said photons for only a limited and very short period of time with said channels consecutively numbered $1, 2, \ldots, n, \ldots, N$ and with each nth said channel containing an analog signal amplitude $A_n$ and with all non-zero $A_n$ values that are caused by a single said spectral particle occupying sequential and adjacent channels with no zero values therebetween, a first source providing a sequence of analog signals representative of said signal amplitudes $A_n$, and a second source providing a sequence of digital clock signals representative of said channel numbers n, an apparatus for determining the centroid channel locations $\Sigma nA_n/\Sigma A_n$ indicative of said energy distribution and combining said centroid channel locations into a distribution that is accurately indicative of the energy distribution of the emission from said continuously emitting source, said apparatus comprising:

means for sequentially interrogating said N channels at a very rapid scan rate and detecting non-zero $A_n$ values;

means operative during each scan for generating a digital signal representative of p, the value of n immediately preceding that whereat $A_n$ takes its first non-zero value;

means operative during each scan for converting said analog $A_n$ signals to digital $A_n$ signals;

means operative during each scan for joining said digital $A_n$ signals to produce a digital signal representing $\Sigma A_n$;

means operative during each scan for making digital signals representative of $1, 2, \ldots, m$ where m is the number of times that said detecting means detects a non-zero $A_n$ value;

means operative during each scan for pairwise multiplying said digital $1, 2, \ldots, m$ signals with said digital $A_n$ signals to produce digital signals representing $1\ A_{p+1}, 2\ A_{p+2}, \ldots, m\ A_{p+m}$;

means operative during each scan for summing said digital $1\ A_{p+1}, 2\ A_{p+2}, \ldots, m\ A_{p+m}$ signals to produce a digital signal representing $\Sigma nA_n - p\Sigma A_n$;

means operative during each scan for rapidly dividing said digital $\Sigma nA_n - p\Sigma A_n$ signal by said digital $\Sigma A_n$ signal to produce a digital signal representing $(\Sigma nA_n/\Sigma A_n) - p$;

means operative during each scan for adding said $(\Sigma nA_n/\Sigma A_n) - p$ signal to said p signal to produce a digital signal representing one of said centroid channel locations $\Sigma nA_n/\Sigma A_n$; and means for processing said digital signals, individually representing said centroid channel locations, made during many scans, into a measured distribution accurately indicative of the energy distribution of the emission from said continuously emitting source.

2. Apparatus, as recited in claim 1, wherein said dividing means comprises the use of a memory programmed with a look up table giving the quotient values associated with all possible dividend/divisor combinations.

3. Apparatus, as recited in claim 1, wherein said dividing means comprises the use of TTL logic such as employed in SN54/74S508 bus-organized 8×8 high speed multiplier/divider devices.

4. Apparatus, as recited in claim 1, wherein said dividing means comprises the use of an algorithm that repetitively substracts the divisor from the dividend and is carried out by standard off-the-shelf components.

5. For a spectroscopic system for measuring an energy distribution of an emission from a continuously emitting source, which includes a collimator for collimating said emission, a dispersive element for spatially resolving said emission by energy into a spectral particle distribution, an asemblage of one or more series employed microchannel plates disposed so that the particular location at which any said spectral particle hits the first said microchannel plate is determined by the energy of said spectral particle, a phosphor layer associated with said assemblage of microchannel plates for producing photons when struck by electrons generated by said assemblage of microchannel plates when hit by said spectral particles, a fiber-optics element for conducting said photons to a linear diode array with said linear diode array providing N channels of information that remain activated by said photons for only a limited and very short period of time with said channels consecutively numbered $1, 2, \ldots, n, \ldots, N$ and with each nth said channel containing an analog signal amplitude $A_n$ and with all non-zero $A_n$ values that are caused by a single said spectral particle occupying sequential and adjacent channels with no zero values therebetween, a first source providing a sequence of analog signals representative of said signal amplitudes $A_n$, and a second source providing a sequence of digital clock signals representative of said channel numbers n, a method for determining the centroid channel locations $\Sigma n A_n / \Sigma A_n$ indicative of said energy distribution and combining said centroid channel locations into a distribution that is accurately indicative of the energy distribution of the emission from said continuously emitting source, said method comprising:

sequentially interrogating said N channels at a very rapid scan rate and detecting non-zero $A_n$ values;

generating, during each scan, a digital signal representative of p, the value of n immediately preceding that whereat $A_n$ takes its first non-zero value;

converting, during each scan, said analog $A_n$ signals to digital $A_n$ signals;

joining, during each scan, said digital $A_n$ signals to produce a digital signal representing $\Sigma A_n$;

making, during each scan, digital signals representative of $1, 2, \ldots, m$ where m is the number of times that $A_n$ is detected as non-zero;

pairwise multiplying, during each scan, said digital $1, 2, \ldots, m$ signals with said digital $A_n$ signals to produce digital signals representing $1 A_{p+1}, 2 A_{p+2}, \ldots, m A_{p+m}$;

summing, during each scan, said digital $1 A_{p+1}, 2 A_{p+2}, \ldots, m A_{p+m}$ signals to produce a digital signal representing $\Sigma n A_n - p \Sigma A_n$;

rapidly dividing, during each scan, said digital $\Sigma n A_n - p \Sigma A_n$ signal by said digital $\Sigma A_n$ signal to produce a digital signal representing $(\Sigma n A_n / \Sigma A_n) - p$;

adding, during each scan, said $(\Sigma n A_n / \Sigma A_n) - p$ signal to said p signal to produce a digital signal representing one of said centroid channel locations $\Sigma n A_n / \Sigma A_n$; and processing said digital signals, individually representing said centroid channel locations, made during many scans, into a measured distribution accurately indicative of the energy distribution of the emission from said continuously emitting source.

* * * * *